Oct. 1, 1963 D. L. BIESECKER 3,105,725
BALL BEARING
Filed March 17, 1961
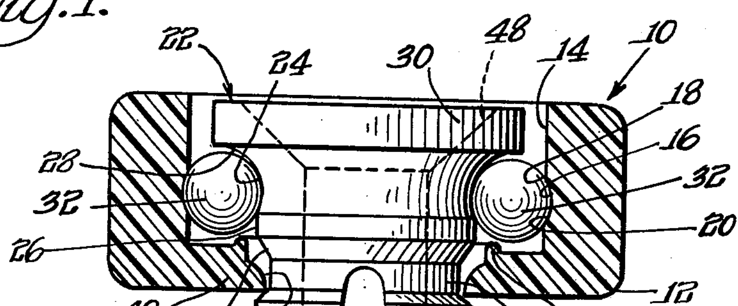
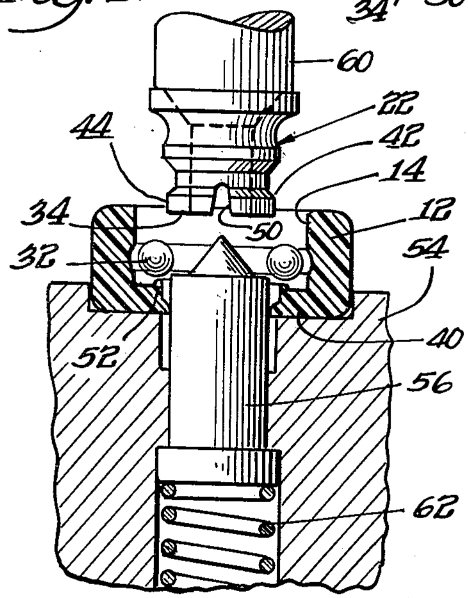
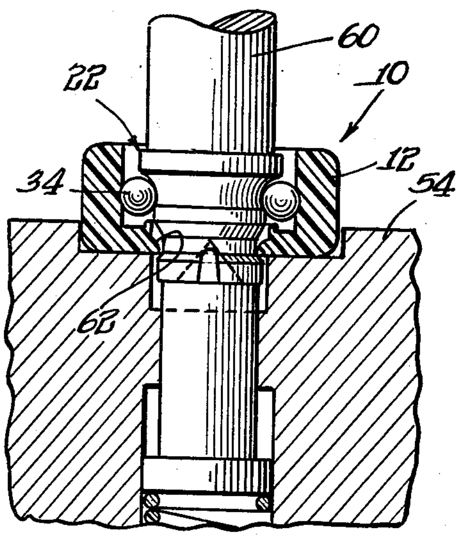
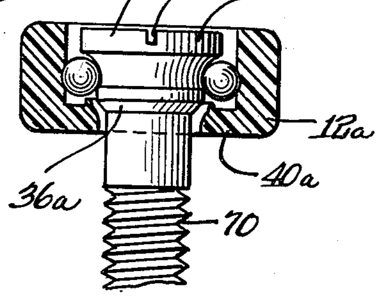
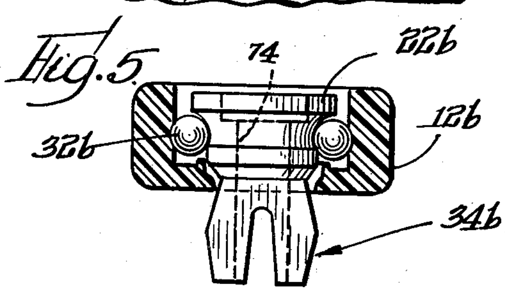
INVENTOR.
Donald L. Biesecker
BY: Olson & Trexler
attys.

United States Patent Office 3,105,725

Patented Oct. 1, 1963

3,105,725
BALL BEARING

Donald L. Biesecker, Arlington Heights, Ill., assignor to Illinois Tool Works Inc., a corporation of Delaware Filed Mar. 17, 1961, Ser. No. 96,406
5 Claims. (Cl. 308—195)

The present invention relates to ball bearings.

One object of the invention is to provide a ball bearing having a new and improved construction which effects very material economy in the manufacture of the bearing while at the same time providing an extensive trouble free service life of the bearing.

Another object is to provide for manufacturing a bearing of the character recited in the preceding object by an exceptionally low cost method well adapted to be carried out on a mass production basis.

Another object is to provide a new and improved ball bearing in which the component elements of the bearing are maintained in assembled running relation to each other by the interfitting running relationship of the bearing balls to the inner and outer bearing races each of which is formed of an integral one-piece construction.

A further object is to provide an improved ball bearing as recited in the preceding objects in which the inner and outer bearing races are positively held in assembled relation to each other by the cumulative retaining action of the interfitting relationship of the bearing balls to the races and a positive interlocking relationship of component elements of the races having a running fit with each other and serving to preclude substantial axial displacement of the bearing races with respect to each other.

Other objects and advantages will become apparent from the following description of the exemplary embodiment of the invention illustrated in the drawings, in which:

FIGURE 1 is a transverse longitudinal sectional view of a ball bearing provided by the invention;

FIG. 2 is a partially sectional view illustrating one phase of the method provided for assembling the bearing of FIG. 1;

FIG. 3 is a partially sectioned view illustrating another phase in the assembly of the bearing;

FIG. 4 is a sectional view of a modified bearing provided by the invention and including an integral mounting stud; and FIG. 5 is a sectioned view of another modified bearing embodying the invention.

Referring to the drawings in greater detail, the ball bearing 10 forming the first illustrated embodiment of the invention, FIGS. 1 to 3, comprises an outer annular bearing race 12 formed of a resilient polymeric material, preferably nylon, and having an integral one-piece construction. The outer bearing race has a cylindrical overall form and encircles an internal well 14. The race 12 is shaped to define an inwardly facing, outer bearing ball groove or channel 16, bounded on opposite sides by circumferentially continuous annular shoulders 18, 20, having minimum diameters with respect to the axis of the bearing which are substantially less than the maximum diameter of the ball groove or channel 16.

Formation of the outer bearing race 12 from a resilient polymeric material such as nylon provides for limited radial expansion of this race during assembly of the bearing, as will presently appear, while at the same time serving in service to define the highly advantageous outer channel for the bearing balls which requires no lubrication.

The outer race 12 encircles an inner bearing race 22 which is also formed from a resilient polymeric material, preferably nylon. Like the outer bearing race 12, the inner bearing race 22 has an integral, one-piece construction and is formed to define an inner bearing ball groove or channel 24 bounded on opposite sides by a relatively low, circumferentially continuous shoulder 26 and a relatively high, circumferentially continuous shoulder 28. Both of the shoulders 26 and 28 have diameters substantially exceeding the minimum diameter of the ball channel 24 and serve, as will presently appear, to engage coacting balls for holding the components of the bearing in mutually assembled relation to each other.

It should be observed that the relatively high shoulder 28, which has a diameter materially greater than that of the shoulder 26, extends radially outward within the well 14 within the outer race 12 to provide on the inner race 22 a radially enlarged head 30 which, as will presently appear, is designed to accommodate the head of a mounting screw or bolt for the inner race.

Provision is made, as will presently appear, for assemblying a plurality of disconnected bearing balls 32 between the inner and outer races 22, 12 to roll within the ball channels 24, 16 of the respective races. The balls 32 have diameters which are approximately equal to the dimensional difference between the maximum radius of the outer ball channel 16, with respect to the axis of the bearing, and the corresponding minimum radius of the inner ball channel 24.

The end of the inner race 22 opposite from the larger or relatively high shoulder 28 extends axially beyond the relatively low annular shoulder 26 of the inner race. The portion of this axial extension 34 of the inner bearing race which is disposed immediately beyond the relatively low annular shoulder 26 defines an annular ball spreading cam 36 having a truncated conical shape, as illustrated in FIG. 1. The outer end of the ball spreading cam 36 merges with a cylindrical neck 38 having a diameter substantially less than that of the shoulder 26.

The neck 38 is closely encircled by the inner periphery of a flange 40 formed on the adjacent end of the outer race 12 and extending radially inward at one side of the outer bearing groove 16, as shown. Beyond the flange 40, the inner race extension 34 is radially enlarged in relation to the neck 38 to form an enlargement 42 having an over-all transverse diameter substantially greater than the diameter of the inner periphery of the flange 40 encircling the neck 38. The enlargement 42 defines a cam surface 44 extending from the portion of the enlargement 42 having the greatest diameter to the outer end of the extension 34 and having a progressively decreasing diameter toward the end of the extension 34.

The inner race 22 defines an axial bore 46 extending through the race for reception of a mounting screw or bolt for the inner race. A counterbore 48 of truncated conical shape formed in the enlarged head 30 of the inner race provides space for accommodating the head of a flat headed mounting screw (not shown).

The circumferential continuity of the enlargement 42 of the projecting end of the extension 34 is interrupted by a number of cut-outs 50 extending axially into the extension 34, as shown in FIG. 1. The circumferential discontinuities thus formed in the extension 34 provide for radial contraction of the projecting end of the extension 34 to fit through the flange 40, as will presently appear.

An annular protuberance 52 formed on the flange 40 is disposed radially inward from the outer channel 16 and protrudes toward the channel 16 to occupy a position closely adjacent the relatively low shoulder 26 on the inner race when the bearing is assembled, FIG. 1. The protuberance 52 serves to advantage in providing support to the bearing balls 32 during assembly of the bearing, as will be described.

One phase in the assembly of the bearing thus provided in accordance with the invention is illustrated in FIG. 2. As shown in this figure, the outer bearing race 12 is supported in a horizontal position on a suitable support 54 and a crowned plunger 56 is inserted upwardly through the opening defined by the flange 40 to extend into the well 14 within the outer bearing race, as shown. It will be noted that the race 12 is oriented so that the flange 40 is at the lower end of the race as the race rests on the support 54.

The requisite number of bearing balls 32 is dropped into the race 12 where they are automatically distributed around the race by the upwardly protruding crowned end of the plunger 56. Support for the bearing balls 32 is provided either initially or later during assembly of the bearing by the previously described annular protuberance 52 on the flange 40.

The inner bearing race 22 is brought into overlying concentric relation to the outer race 12 with the extension 34 pointing downwardly, whereupon the inner race is moved axially downward by a suitable press or plunger 60. See FIGS. 2 and 3.

As the race 22 moves downwardly, the lower end of the extension 34 engages the plunger 56 displacing it downwardly against a supporting spring 62. The downwardly converging spreading surface 44 on the inner race enlargement 42 moves the previously distributed balls 32 radially outward into the outer ball channel 16, the balls being supported by the protuberance 52 until they are displaced into the channel 16.

The enlargement 42 contracts radially as necessary to pass the balls 32.

The neck 38 moves easily past the centers of the balls 32 bringing the ball spreading cam 36 into engagement with the balls which are then seated in the channel 16.

The annular ball spreading cam 36 serves to cam the balls 32 over the relatively low shoulder 26 which has a diameter exceeding that of the inner channel 24 in which the balls run.

The ball spreading cam 36 applies radially outward force to all the balls 32 which causes a slight swelling of the nylon outer race 12 which, because of the resilient quality of the polymeric material of its construction, is able to withstand this expansion without deleterious distortion.

At the same time, the inward reaction of the balls on the inner race 22 causes the structure of the inner race to yield somewhat under the extraordinary load applied to allow movement of the balls 32 into place between the two channels. The nylon inner race is not harmed by this "giving" under excessive load. It is particularly noteworthy that at this time the inner bore 46 of the inner race is not filled by the presence of a supporting screw as it is later when the bearing is in use. The unfilled space within the inner race at the time of assembly facilitates movement of the bearing balls over the relatively low shoulder 26.

The axial movement of the inner race 22 into assembled relation to the outer race 12 causes the camming surface 44 on the extension 34 to move through the opening encircled by the outer race flange 40. This movement is facilitated by the radial contractability of the enlargement 42, previously described, and by a rounded shaping of the inner edge 62 of the flange 40, FIGS. 1 and 3, which is engaged by the cam surface 44.

As the inner race 22 reaches its fully assembled position within the outer race, the enlargement 42 expands to its full size where it is subsequently held against contraction by fitting of a support screw or the like within the axial bore 46.

The inner race 22 is held against axial displacement out of its assembled position in relation to the outer race by the interfitting relationship of the bearing balls with the ball channels 24, 16 in the respective races. This retention of the parts in assembled relation to each other is supplemented by the interlocking relationship of the flange 40 with the enlargement 42 which is positively reinforced upon installation of the bearing by the supporting part (not shown) fitted within the bore 46.

In the modified bearing illustrated in FIG. 4, in which components forming counterparts of the bearing previously described are identified with the same numbers with the addition of the suffix "*a*," the inner race **22*a* is formed as an integral part of a threaded mounting stud 70 for the bearing. The threaded stud 70 forms an axial continuation of the race 22*a* which extends axially from the ball spreading cam surface 36*a* beyond the outer race 12*a*, as shown. A kerf 72 cut in the head 30*a* of the inner race 22*a* is designed to receive a screwdriver (not shown) for rotating the threaded stud 70** into a coacting support (not shown).

In the modified bearing illustrated in FIG. 5, in which component elements forming counterparts of the bearing of FIG. 1 are identified with the same reference numbers with the addition of the suffix "*b*," the inner race **22*b* is formed to function as a screw grommet. For this purpose, the projecting end of the axial extension 34*b* of the race 22*b* is elongated, further enlarged and circumferentially interrupted for use in fastening the element 22*b* to a coacting support member. A counterbored axial bore 74 in the element 22*b*** is designed to accommodate a headed support bolt or the like.

The invention is claimed as follows:

1. A ball bearing comprising, in combination, an outer race formed of a resilient polymeric material having an integral one-piece construction and defining an outer bearing ball channel bounded on opposite sides by circumferentially continuous annular shoulders, said outer race defining at one end thereof a circumferentially continuous flange extending radially inward at one side of said bearing channel, an inner bearing race having an integral one-piece construction defining a inner bearing ball channel bounded on opposite sides by a relatively low circumferentially continuous shoulder and a relatively high circumferentially continuous shoulder, said inner race including an axial extension extending from the relatively low shoulder of the race axially beyond said outer race, said extension including a neck closely encircled by said outer race flange and having a diameter substantially less than said relatively low shoulder, said extension including an annular ball spreading cam disposed between said relatively low shoulder and said neck, said extension including a portion thereof disposed beyond said outer race flange and being radially enlarged in relation to said neck, and a plurality of bearing roller balls loosely disposed between said inner and outer channels in running engagement with both channels.

2. A ball bearing comprising, in combination, an outer race formed of a resilient polymeric material having an integral one-piece construction and defining an outer bearing ball channel bounded on opposite sides by circumferentially continuous annular shoulders, said outer race defining at one end thereof a circumferentially continuous flange extending radially inward at one side of said bearing channel, said flange defining thereon an annular protuberance radially spaced inwardly with respect to said bearing channel and protruding axially toward said channel, an inner bearing race formed of a resilient polymeric material and havng an integral one-piece construction defining an inner bearing roller channel bounded on opposite sides by a relatively low circumferentially continuous shoulder and a relatively high circumferentially continuous shoulder, said inner race defining a bore extending axially therethrough, said inner race including an axial extension extending from the relatively low shoulder on the race axially beyond said outer race, said extension including a neck closely encircled by said outer race flange and having a diameter substantially less than that of said relatively low shoulder, said extension including an annular ball spreading cam disposed between said relatively low shoulder and said neck, said extension including a portion thereof disposed beyond said outer race flange and being radially enlarged in relation to said neck, the outer end of said extension defining a peripheral surface progressively contracting in diameter in an axially outward direction, and a plurality of bearing balls loosely disposed in said inner and outer channels and having diameters approximately equal to the difference between the maximum radius of the outer channel and the minimum radius of the inner channel.

3. A ball bearing comprising, in combination; an outer race formed of a resilient polymeric material and having an integral one-piece construction defining a bearing ball groove bounded on opposite sides by circumferentially continuous, inwardly extending annular shoulders; said outer race defining an annular flange extending radially inward at one side of the ball groove, an inner race formed of a resilient polymeric material having an integral one-piece construction defining a bearing ball groove bounded on opposite sides by circumferentially continuous outwardly extending annular shoulders, said inner race including an axial extension thereon, said inner race extension including a cylindrical neck closely encircled by said flange on said outer race and having a diameter substantially less than that of the adjacent shoulder on the inner race, said extension including an annular ball spreading cam of truncated conical form located between said neck and said adjacent shoulder, said extension including a radial enlargement thereof disposed beyond said outer race flange and having a maximum radius with respect to the axis of the bearing which exceeds the minimum radius of said flange, the side of said enlargement more remote from the inner race cam groove defining a peripheral cam surface enlarged toward said inner race groove, said inner race defining an axial bore extending therethrough, the projecting end of said axial extension on said inner race being interrupted circumferentially by cut-outs therein which allow contraction of said enlargement of the extension.

4. A ball bearing comprising, in combination, an outer race formed of a resilient plastic material having an integral one-piece construction and defining an outer bearing ball channel bounded on opposite sides by circumferentially continuous annular shoulders, said outer race defining at one end thereof a circumferentially continuous flange extending radially inward at one side of said bearing channel, an inner bearing race having an integral one-piece construction defining an inner bearing ball channel bounded on opposite sides by a relatively low circumferentially continuous shoulder and a relatively high circumferentially continuous shoulder, said inner race including an axial extension extending from the relatively low shoulder of the race axially beyond said outer race, said extension including a neck closely encircled by said outer race flange and having a diameter substantially less than said relatively low shoulder, said extension beyond said neck portion including fastener means extending beyond the aforesaid outer race flange to facilitate mounting of said ball bearing to a workpiece, and a plurality of bearing roller balls loosely disposed between said inner and outer channels in running engagement with both channels.

5. A ball bearing of the type described in claim 4 wherein said relatively high circumferentially continuous shoulder presents an end surface having slot means therein and wherein said fastener means which extends axially beyond said extension comprises a screw member.

References Cited in the file of this patent

UNITED STATES PATENTS

| | | |
|---|---|---|
| 942,392 | Koch | Dec. 7, 1909 |
| 1,910,208 | Gronberg | May 23, 1933 |
| 2,350,228 | Hanes | May 30, 1944 |
| 2,805,107 | Van de Warker et al. | Sept. 3, 1957 |
| 2,913,284 | Zankl | Nov. 17, 1959 |
| 2,913,810 | Heim | Nov. 24, 1959 |
| 2,928,701 | Ferdig | Mar. 15, 1960 |
| 2,976,089 | Vogt | Mar. 21, 1961 |
| 2,986,802 | Spence et al. | June 6, 1961 |
| 3,034,839 | Schoos | May 15, 1962 |

FOREIGN PATENTS

| | | |
|---|---|---|
| 379,087 | France | Oct. 24, 1907 |
| 730,426 | Great Britain | May 25, 1955 |